(12) United States Patent
Goldenberg

(10) Patent No.: US 6,196,346 B1
(45) Date of Patent: Mar. 6, 2001

(54) DEVICE FOR TRANSVERSE DISPLACEMENT OF A VEHICLE AND A VEHICLE PROVIDED THEREWITH

(76) Inventor: Boris Goldenberg, 1305 E. 18th St., Brooklyn, NY (US) 11230

( * ) Notice: Subject to any disclaimer, the term of this patent is extended or adjusted under 35 U.S.C. 154(b) by 0 days.

(21) Appl. No.: 09/039,273

(22) Filed: Mar. 12, 1998

(51) Int. Cl.[7] .................................................. B60S 9/205
(52) U.S. Cl. .................................... 180/199; 180/53.61
(58) Field of Search .................................. 180/199, 200, 180/201, 53.6, 53.61

(56) References Cited

U.S. PATENT DOCUMENTS

| | | | |
|---|---|---|---|
| 1,473,369 | * | 11/1923 | Williams et al. ............... 180/200 |
| 1,553,851 | * | 9/1925 | Diffenderffer et al. ........... 180/200 |
| 1,572,250 | * | 2/1926 | Smith ........................... 180/200 |
| 1,686,460 | * | 10/1928 | Moffat .......................... 180/200 |
| 1,728,407 | * | 9/1929 | Hall ............................ 180/200 |
| 1,736,498 | * | 11/1929 | Jensen .......................... 180/200 |
| 1,761,554 | * | 6/1930 | Woolley ......................... 180/200 |
| 1,764,486 | * | 6/1930 | Woolley ......................... 180/200 |
| 1,928,305 | * | 9/1933 | Blakesley ....................... 180/200 |
| 1,944,501 | * | 1/1934 | Dounis et al. ................... 180/200 |
| 2,054,842 | * | 9/1936 | Walker .......................... 180/200 |
| 2,235,595 | * | 3/1941 | Stein ........................... 180/202 |
| 2,808,271 | * | 10/1957 | Devenne ......................... 280/761 |
| 3,029,886 | * | 4/1962 | Hansen .......................... 180/200 |
| 3,738,284 | * | 6/1973 | Atsua et al. .................... 105/177 |

* cited by examiner

Primary Examiner—Kevin Hurley
Assistant Examiner—Andrew J. Fischer
(74) Attorney, Agent, or Firm—I. Zborovsky

(57) ABSTRACT

A device for transverse movement of a vehicle has longitudinal rotatable axles and transverse rotatable axles, four rotatable wheels fixedly connected with two longitudinal rotatable axles, couplings through which the wheels are connected with four transverse rotatable axles, so that when wheels of a vehicle cooperate with the device, the device displaces the vehicle to the right and to the left depending on direction of rotation of the wheels of the vehicle.

1 Claim, 5 Drawing Sheets

DEVICE FOR TRANSVERSE DISPLACEMENT OF A VEHICLE AND A VEHICLE PROVIDED THEREWITH

BACKGROUND OF THE INVENTION

The present invention relates to a device for transverse displacement of a vehicle, and a vehicle provided with the device.

Vehicles are known in many modifications. However, there is no device which allows to displace or move the vehicle transversely, since the wheel pair can be turned only at a certain angle to the main axis of the vehicle. However, in many cases it is necessary to move the vehicle exactly in the transverse direction, transversely to the main axis, for example for parking into a space which is exactly equal to the length of the vehicle, as well as leaving the parking space. It is necessary also to provide moving out when the wheels with a minimal engagement with the surface or in the case of deep furrow of the roadway without a road covering. In all these cases, it is difficult or in some cases even impossible, for example placement of the vehicle between two other vehicles, to provide a transverse displacement of the restrained vehicle especially when it has great sizes.

SUMMARY OF THE INVENTION

Accordingly, it is an object of present invention to provide a device for a transverse displacement of a vehicle to the right and to the left from the longitudinal axis of the vehicle, for example directly after its stopping.

It is also the object of the present invention to provide such a device which utilizes energy of the vehicle and does not have a fixed connection with the vehicle itself, so that it can be used for other vehicles without the vehicle construction.

The other devices for analogous objectives (as disclosed for example in U.S. Pat. No. 2,235,595) as a rule are fixedly connected with a transmission of the vehicle, which make the construction of the vehicle complicated and more expensive. The proposed construction is very simple, introduced separately, it can be used on the vehicles of different constructions and designs.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
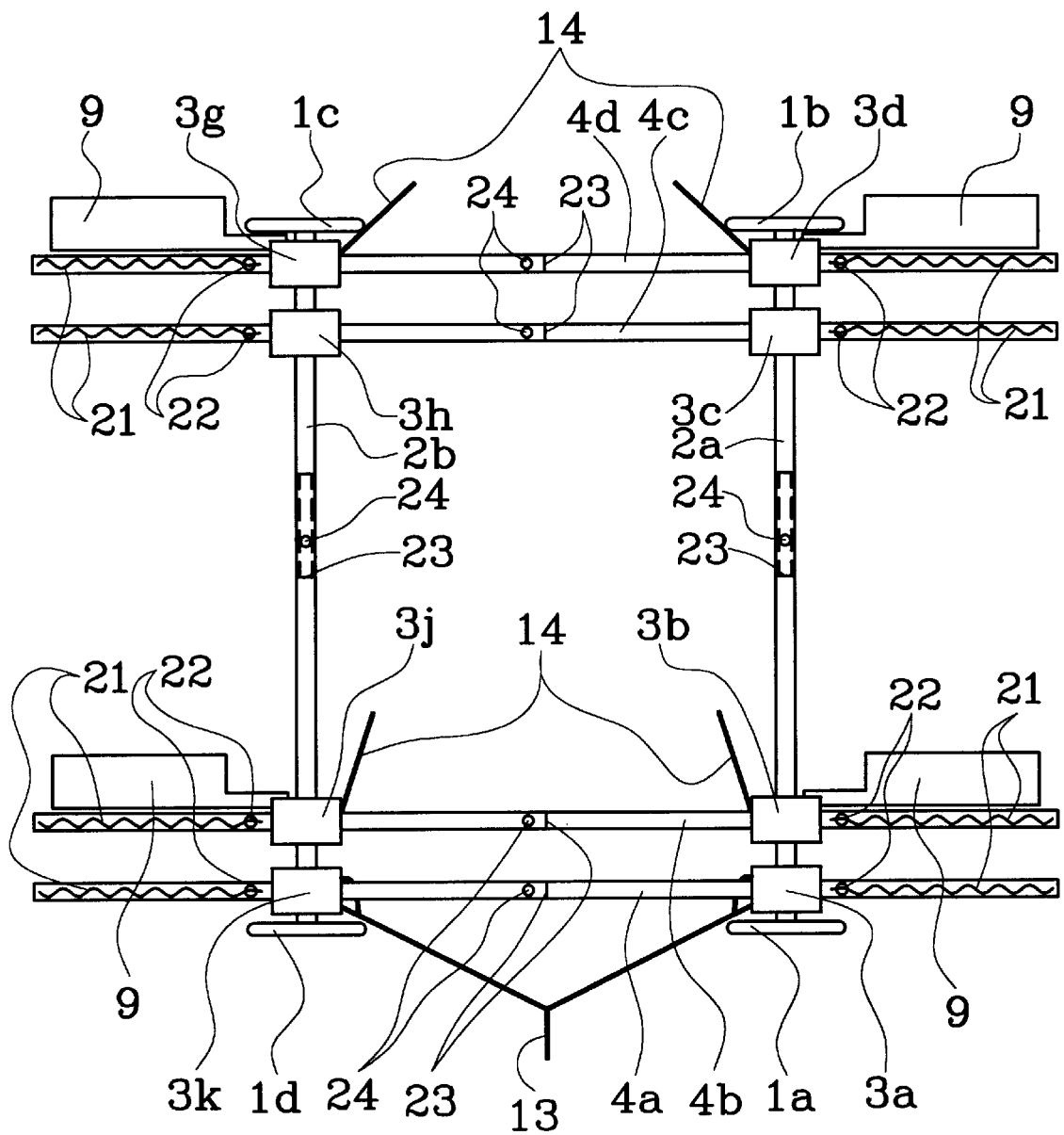
FIG. 1 is a plan view of a device for transverse displacement of the vehicle in accordance with the present invention.

A device for transverse displacement of a vehicle shown in FIG. 1 is provided with a plurality of wheels 1a, 1b, 1c, 1d, which simultaneously serve as supports under front and rear wheels of a vehicle. They are arranged perpendicular to the plane of the wheels of the vehicle and fixedly connected with movable rods 2a, 2b. The movable rods are connected longitudinal through couplings 3a, 3b, 3c, 3d with movable shafts 4a, 4b, 4c, 4d which have free ends for contacting with the wheels of the vehicle. One of the shafts 4a which is directly contact with transverse the driving wheels of the vehicle is connected with the rod 2a through a worm transmission illustrated in FIG. 2 and identified with reference numerals 15, 16. It is located in the coupling 3a.

During rotation of the wheels of the vehicle and in the case of their contact with the shaft 4a, its rotation takes place and it is transmitted through the worm transmission located in the coupling 3a into a transverse rotation of the rod 2a of the vehicle, so that the longitudinal movement of the wheels of the vehicle is converted into the transverse movement of the wheels 1a, 1b, 1c, 1d of the inventive device.

Figure 2:
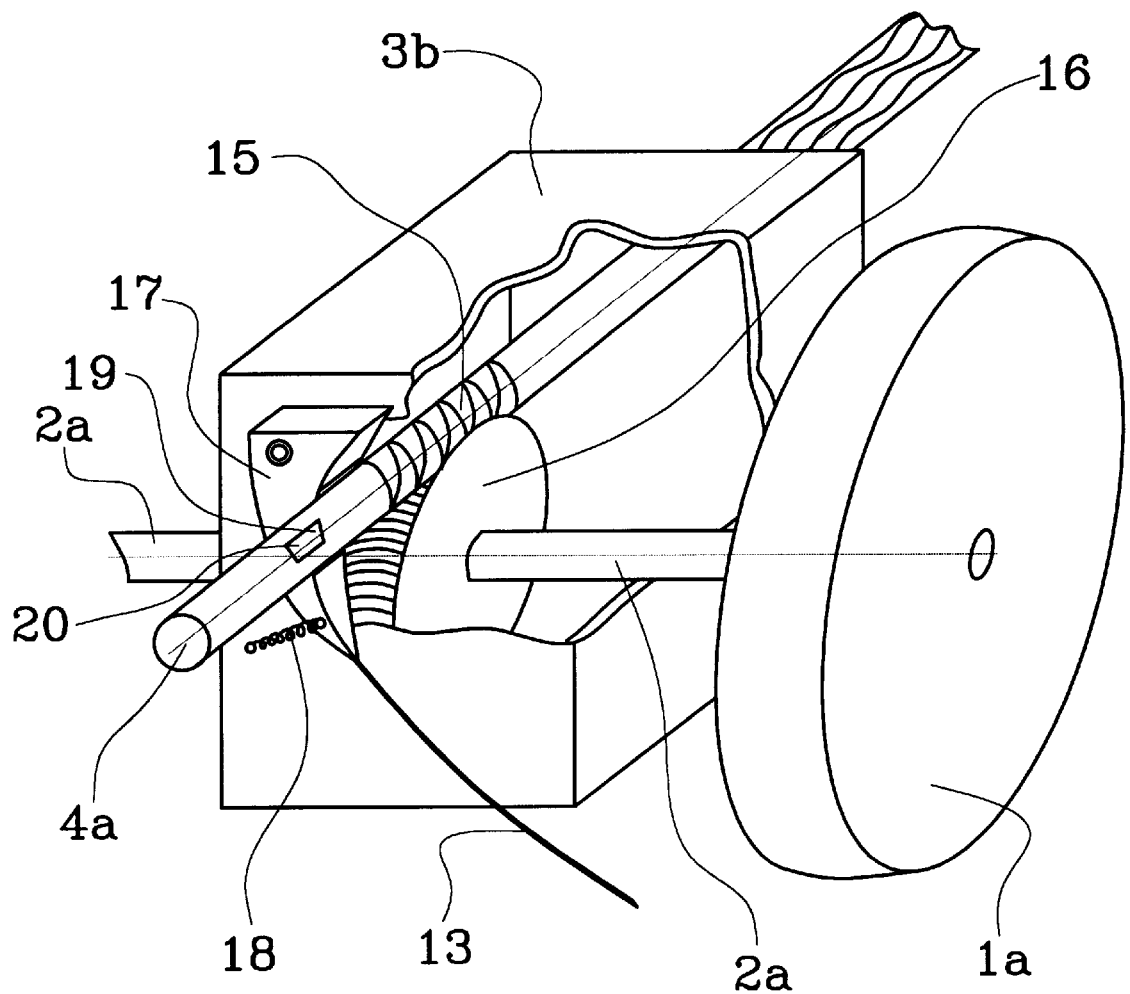
FIG. 2 is a perspective view of a part of the device.

The coupling with the worm transmission is shown in FIG. 2. A spring-biased lever 17 formed as an arc with an inner radius equal to the radius of the shaft 4a is connected to the coupling. Analogous lever is mounted on a bushing 3k from the opposite side to connect the shaft 4a with the rod 2b. The oval lever is connected to the casing of the coupling by the expansion spring. A cable leading to a cabin of the vehicle is connected to the semi-circular lever. The semi-circular lever is provided on its concave surface with a projection 11 which has a size exactly corresponding to a depression of the shaft 4a. During contact of the lever 17 with the shaft 4a they coincide with the full blocking of the shaft rotation.

In order to improve the engagement of the shaft 4a with the driving wheels of the vehicle, pipes with a structure 21 formed for example as fins are placed on the free ends of the shaft 4 and are fixedly connected with the shaft 4a by a screw 22. The rods 2a, 2b and the shafts 4a, 4b, 4c, 4d are provided in the middle with separating joints 23 with fixing screw 24. Therefore, the length and the width of the proposed device can be changed depending on the length and the width of the vehicle, by loosening of the fixing screw 24 with subsequent size adjustment and tightening it again.

In order to improve running on and running off, planes 9 are arranged before the free ends of the shafts 4b and 4c. They are fixedly mounted on the couplings 3b, 3d, 3g, 3j and formed with the surface at an angle on which the vehicle is placed.

Figure 3:
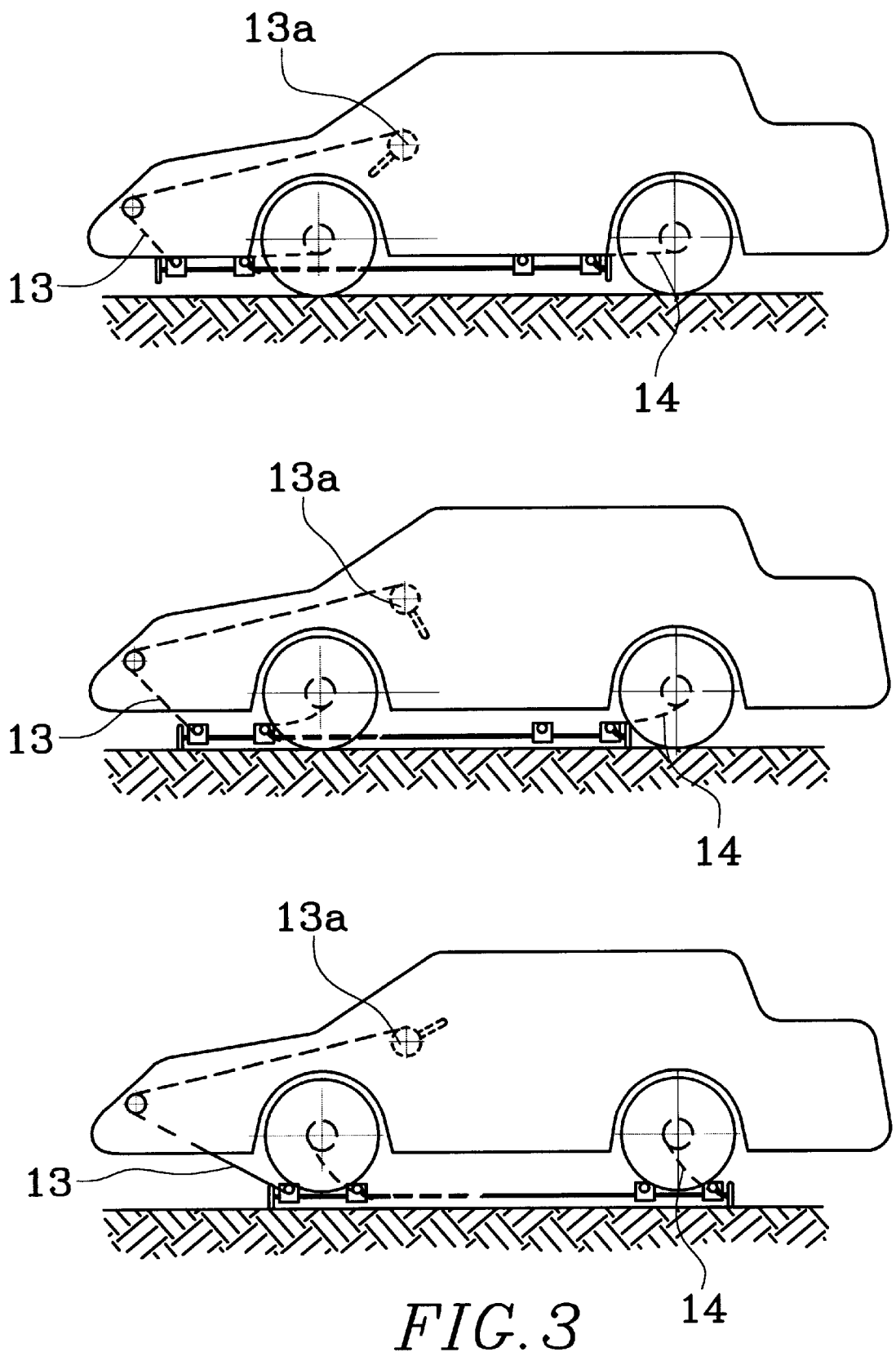
FIGS. 3a, 3b, 3c are views illustrating showing operating of the inventive device in various stages.

The proposed device can be connected to the vehicle by cables as shown in FIG. 3. In the head part of the vehicle the cable is fixed to a lever 13a which is located in the driver's cabin and allows to lower the device under the wheels of the vehicle for its use, and to lift the inventive device to the bottom of the vehicle during conventional driving of the vehicle. For this purpose, the cable extending from the lever in the driver's cabin is fixed to the oval levers on the bushings 3a, 3k of the device. On the opposite side, the device connects the couplings 3a, 3b, 3d, 3g, 3j with the axis of the vehicle. Thereby the proposed device is located between the tensioned cables 13 and 14.

When the inventive device operates in the following manner as shown in FIG. 3. In the initial moment, in other words during movement of the vehicle, the device is fixed under the bottom of the vehicle due to the tightening of the cable 13 by the lever 13a and as a result the tightening of the cables 14. Therefore the device is in the lift position and retained by the tightened cables, in particular, by the cables 13 protected to the lever at one side and by the cables 14 connected to the axles of the vehicle on the other side. When it is necessary to move the vehicle in a transverse direction, the vehicle is stopped. Then, by means of the lever 13a the cable 13 is lowered, and the device under the action of its own weight is lowered downwardly along a curve with a radius having a length equal to the length of the cable 14, so that its surface 9 is located under the wheels of the vehicle. After this the vehicle moves onto the device and continuous moving in a transverse direction to the right or to the left depending on the front or the rear movement of the vehicle. For example, during parking when the front gear is turned on, the vehicle will move in one side, and when the rear gear is turned on, the vehicle will move in the opposite side.

When it is necessary to move from the inventive device, the vehicle must be stopped, the cables 13 is tightened by the levers 13a and the cable 13 also pulls the oval levers 17 which contact with the shaft 4a. When the rear gear is turned on, the projection on the oval lever 17 coincides with the opening of the shaft 4a and stops its rotation. In this case the wheels continue rotating and move from the device. Then, by turning further the lever 13a and tightening the cable 13, the device is lifted upwardly, and the vehicle continue its normal movement.

Figure 4:
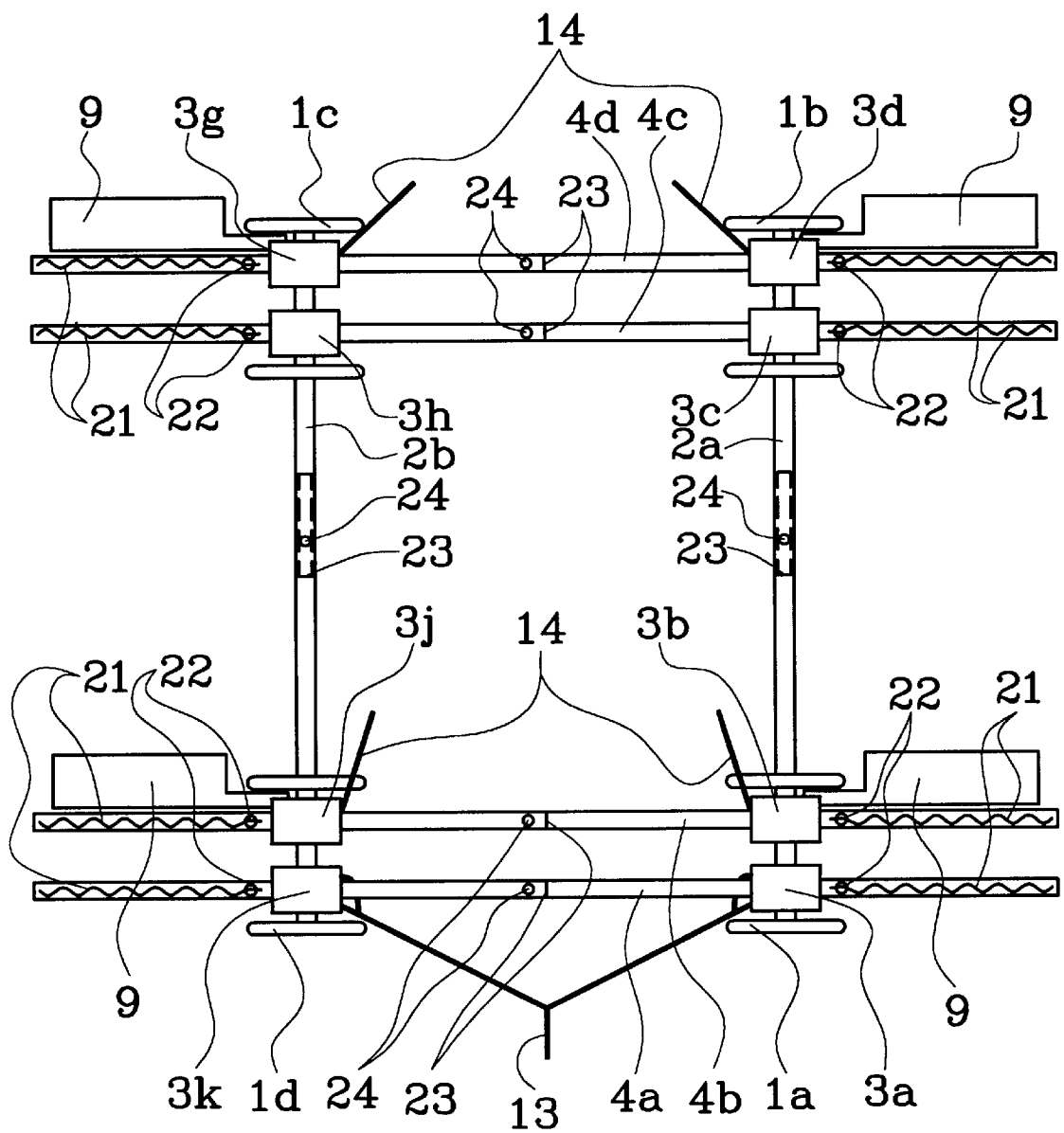
FIGS. 4 and 5 are views showing further modifications of the inventive device.

When the device is used for high load vehicles, for example, busses, trucks, etc., additional wheels can be arranged on the movable axles 2a, 2b as shown in FIG. 4. Therefore, the area of the support of the inventive device is increased.

Figure 5:
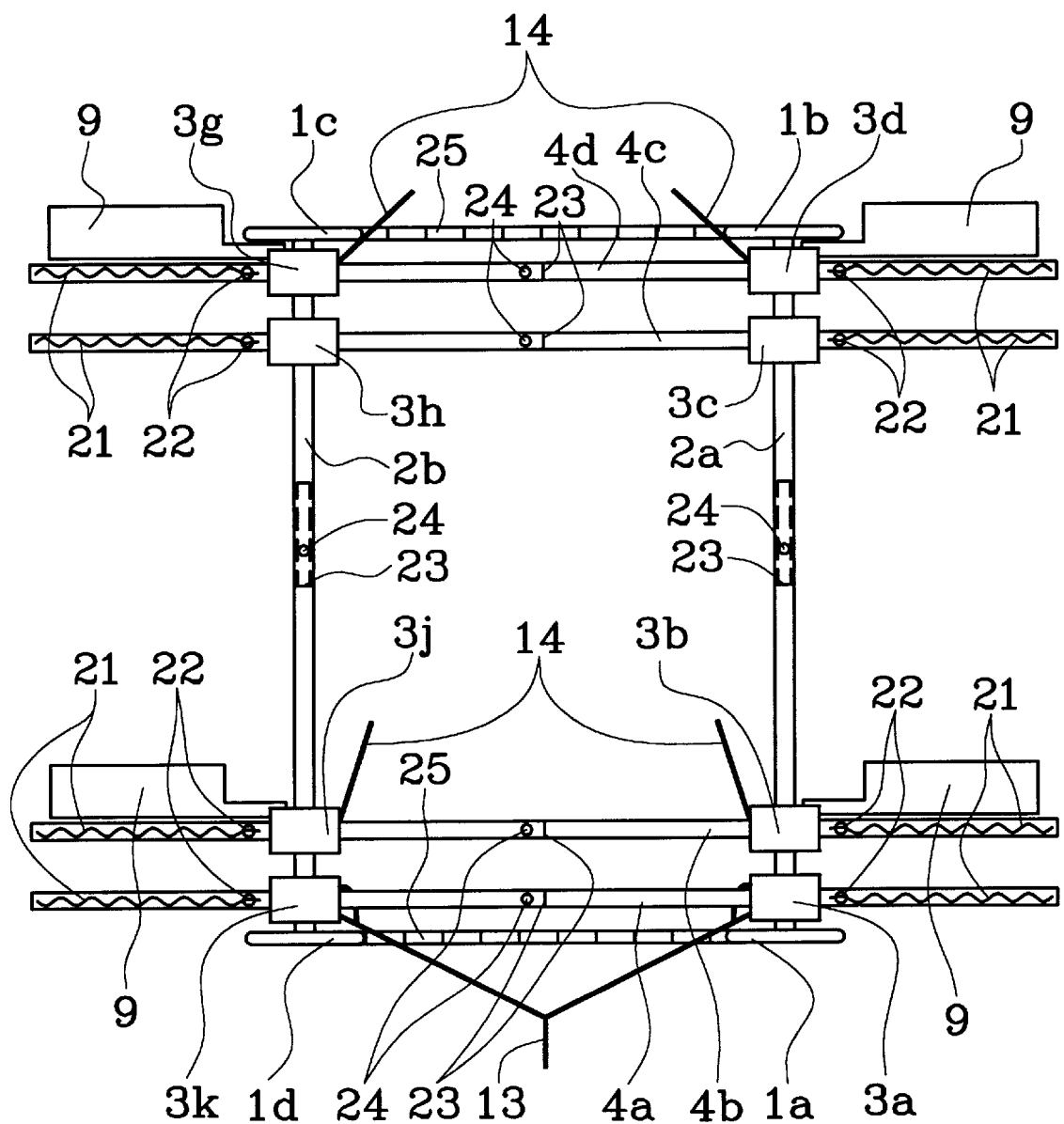

When the device is used for a transverse movement of the vehicle which is stuck in the tip furrow, sandy or marshy area, it is proposed to connect the wheels 1a and 1b as well as 1d and 1c of the device by caterpillar trucks as shown in FIG. 5, which will increase the area of the support of the device between the wheels of the vehicle and make possible movement in the transverse direction along an uneven terrain.

It will be understood that each of the elements described above, or two or more together, may also find a useful application in other types of constructions differing from the types described above.

While the invention has been illustrated and described as embodied in device for transverse displacement of a vehicle and a vehicle provided herewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Patent is set forth in the appended claims:

1. A vehicle system, comprising a vehicle having two pairs of wheels and a bottom; and a device for transverse movement of said vehicle, said device comprising longitudinal rotatable axles, transverse rotatable axles, four rotatable wheels fixedly connected with said longitudinal rotatable axles, couplings through which said wheels are connected with said transverse rotatable axles, said transverse rotatable axles including at least two transverse rotatable axles which are spaced from one another in a longitudinal direction so that one of said pairs of wheels of said vehicle can contact one of said transverse rotatable axles and the other of said pairs of said wheels of said vehicle can contact the other of said transverse rotatable axles and thereby the rotation of said wheels of said vehicle causes a rotation of said wheels of said device; means for holding said device in a suspended condition under said bottom of said vehicle, said means including cables connecting said device with a handle for lowering and lifting of said device and also connectable with said axles of said vehicle, said cables having an opposite end connected to a semi-circular lever located in one of said couplings for blocking said device, said semi-circular lever having a radius corresponding to a radius of an axis of said device, said semi-circular lever having a convex surface provided with a projection having a side corresponding to openings on an axle of said device for contacting, so that when said cable is tightened, said semi-circular levers contact with the axle of said device to transfer a rotation of said wheels of said vehicle to a rotation of said wheels of said device and to block said rotation.

* * * * *